(Model.)

E. R. CAHOONE.
COACH PAD.

No. 245,783. Patented Aug. 16, 1881.

Witnesses:
Charles H. Pell
Edward G. Robertson

Inventor:
Edwin R. Cahoone

UNITED STATES PATENT OFFICE.

EDWIN R. CAHOONE, OF NEWARK, NEW JERSEY.

COACH-PAD.

SPECIFICATION forming part of Letters Patent No. 245,783, dated August 16, 1881.

Application filed April 11, 1881. (Model.)

*To all whom it may concern:*

Be it known that I, EDWIN R. CAHOONE, of Newark, county of Essex, State of New Jersey, have invented a new and Improved Coach-Pad, of which the following is a specification.

The object of my invention is to make a coach pad or saddle cheap, simple, and handsome.

The invention relates to means for securing the parts together without the use of pad-screws and at the same time retaining the appearance of using them; also, to the use of leather strips on the sides of the under pieces to hold the bottom leather in place by tacking said bottom leather to them.

Figure 1:
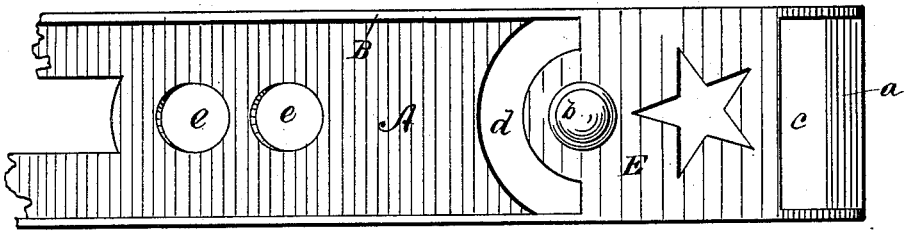
Figure 2:
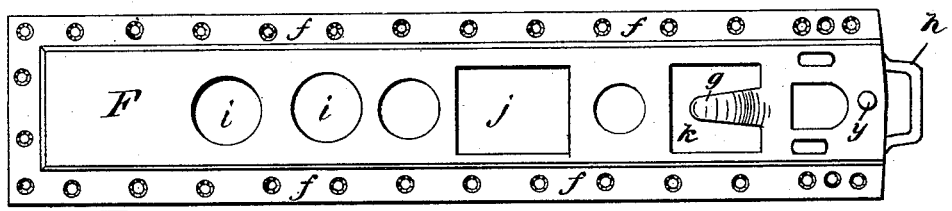
Figure 3:
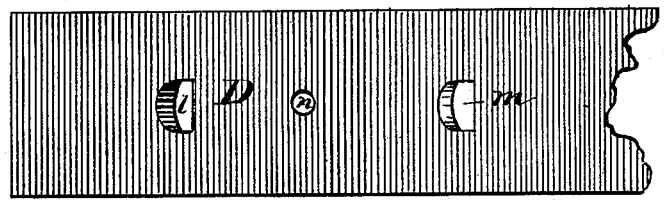
Figures 4, 7:
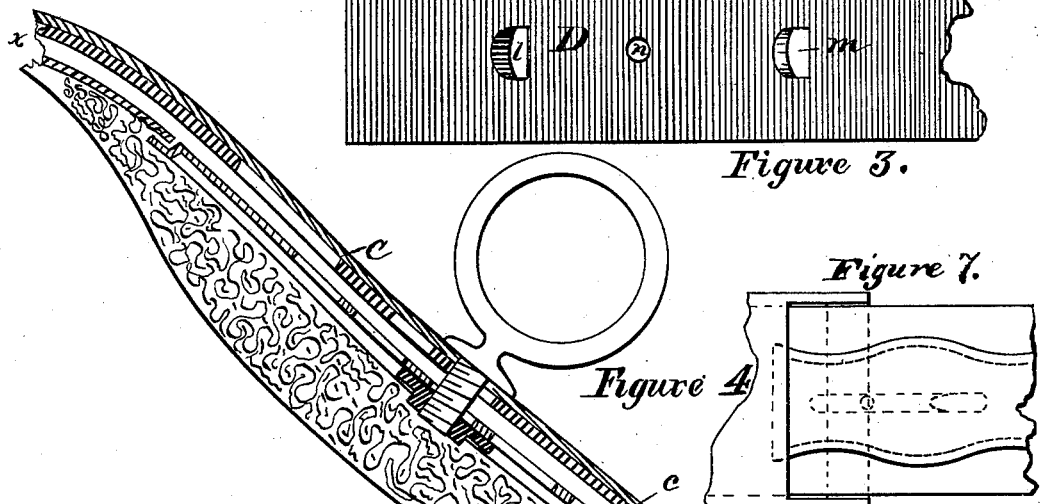
Figure 5:
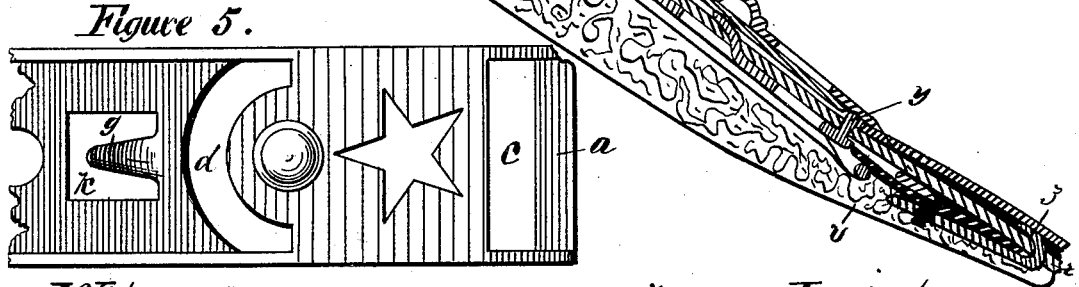
Figure 6:
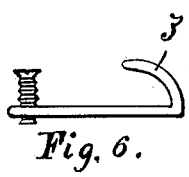

Figure 1 is a top view of one-half of the frame, showing the cross-bar, $a$, the imitation pad-screw head $b$, the opening $c$ to receive the side straps, the opening $d$ to receive the ends of the top leather, and the terret-shank holes $e$ $e$. Fig. 2 is a top view of the under plate, showing the depressed margin containing nail-holes $ff$ for the purpose of nailing on strips of leather, the tongue $g$ cast to it for the purpose of holding the side pieces in place, and the loop $h$ for attaching a hook, when so required. The holes $i$ $i$ are for the terrets' shanks, either hole being used at the option of the maker. The square holes $j$ are for the insertion of the nuts for the terrets as the pad or saddle is designed to be adapted to changeable mounting. The holes $k$ are for allowing the tongue $g$ to be cast to said under pieces. Other holes are of no account, only to lighten. Fig. 3 is a top view of one of the side pieces broken off to receive the tongue $g$. $m$ are holes to receive detachable tongue $z$, Fig. 6. $n$ are holes to receive pins $y$. Fig. 4 is a longitudinal section of one-half of a made-up pad, showing all the different parts in place. Fig. 5 is a view of a part of the frame, showing the tongue $g$ when put on the frame part instead of on the under piece; but I do not herein claim a frame provided with this tongue as shown in this figure, since this will form subject-matter for another application to be by me filed. Fig. 6 is a view of a detachable adjustable tongue or hook. Fig. 7 is a top-plan view of the lower end of the top plate, with the side straps in position.

Similar letters of reference indicate corresponding parts.

The tree or pad plate A has flanges B along the edges of the upper side to receive the top leather, C, in the ordinary way, and openings $d$ to receive the ends of such top leather; also, openings $c$ to receive the side straps, D, and cross-bars $a$, over which the side straps pass, and thence under the elevated portion E. The bars $a$, supporting the side pieces, serve to take the downward strain or pressure of such pieces off the lower parts of the saddle, and hence aid in retaining the saddle in shape. The under plates, F, are depressed about a quarter of an inch from the outer edge, sufficient to tack on the strips of leather, affording the means of nailing on the bottom leather, $n$, which is old in a pad-frame, but new on an under plate. These under plates I make with tongues $g$ and pins $y$ to secure the side pieces D, without necessitating the use of pad-screws. The addition of the pins $y$ gives the fastening an appearance of greater security, and such pins are useful, but not necessary. If these pins are used alone, as in my patent No. 232,113, the superposed parts must fit tightly down thereupon and be held by pad-screws, in order to effect security; but the tongue or hook insures perfect fastening of the side pieces without pad-screws, and the pins $y$ are merely supplemental. Sometimes it is convenient to use the tongue $g$, pins $y$, and adjustable tongues $z$. I sometimes put on the leather ends of pad under pieces an adjustable tongue or hook, $z$, when a very secure job is required.

Generally speaking, the plate A, having flanges B and raised portions with facilities for ornamentation, is old. Further, an under plate with nut-holes and a pin or pins to enter and aid in retaining the side straps is old. I make no claim to such features, broadly; but

What I claim is—

1. The plate A, having flanges B, the bars $a$, and the bridges E, with openings $c$ and $d$, substantially as described.

2. The under plate, F, having a tongue, $g$, and pin $y$, substantially as and for the purpose specified.

3. The under plate, F, provided with edgedepressions, holes $i\ i$, openings $j\ k$, tongues $g$, and pins $y$, all substantially as and for the purpose specified.

4. In a harness-saddle, top plates, A, under plates, F, side pieces, D, and the hooks $g$, as shown, to receive and secure said side pieces without the use of pad-screws, combined with the usual leather parts of a saddle, substantially as described.

5. An under plate, F, provided with the tongue $g$, constructed and arranged as shown, and adapted to hold the side pieces in place without the aid of pad-screws, substantially as described.

6. The under plate, F, provided with depressed edges to receive a strip or strips of leather for attachment of the pad, substantially as described.

7. In a harness-saddle, the combination, with the side pieces and hooks $g$ on the metal portion of the pad to secure said pieces, of the adjustable and detachable hooks $z$, auxiliary to the hooks $g$, and with them obviating the necessity of pad-screws, substantially as and for the purpose described.

EDWIN R. CAHOONE.

Witnesses:
ABRAHAM MANNERS,
EDWARD G. ROBERTSON.